(12) United States Patent
Ribera Salcedo et al.

(10) Patent No.: US 10,518,276 B2
(45) Date of Patent: Dec. 31, 2019

(54) AGGLOMERATING CYCLONE OF THE REVERSE-FLOW TYPE

(71) Applicant: ADVANCED CYCLONE SYSTEMS, S.A., Oporto (PT)

(72) Inventors: Romualdo Luis Ribera Salcedo, Oporto (PT); Julio José Da Silva Paiva, Oporto (PT)

(73) Assignee: ADVANCED CYCLONE SYSTEMS, S.A., Oporto (PT)

( * ) Notice: Subject to any disclaimer, the term of this patent is extended or adjusted under 35 U.S.C. 154(b) by 271 days.

(21) Appl. No.: 15/039,046

(22) PCT Filed: Nov. 25, 2014

(86) PCT No.: PCT/IB2014/066338
§ 371 (c)(1),
(2) Date: May 25, 2016

(87) PCT Pub. No.: WO2015/075702
PCT Pub. Date: May 28, 2015

(65) Prior Publication Data
US 2016/0368004 A1   Dec. 22, 2016

(30) Foreign Application Priority Data
Nov. 25, 2013   (PT) .......................... 107312

(51) Int. Cl.
*B01D 45/00*   (2006.01)
*B04C 5/04*   (2006.01)
(Continued)

(52) U.S. Cl.
CPC ............... *B04C 5/04* (2013.01); *B01D 45/12* (2013.01); *B01D 45/16* (2013.01); *B01D 53/12* (2013.01);
(Continued)

(58) Field of Classification Search
CPC .... C08F 210/16; C08F 210/08; C08F 210/14; C08F 2/01; B04C 5/081; B04C 5/04;
(Continued)

(56) References Cited

U.S. PATENT DOCUMENTS 4,281,512 A * 8/1981 Mills ....................... F01N 3/027
                                                              55/283
4,292,050 A * 9/1981 Linhardt ................ B01D 45/16
                                                              55/434.4

(Continued)

FOREIGN PATENT DOCUMENTS

EP    0259104 A2   3/1988
EP    1487588 B1   7/2007
(Continued)

*Primary Examiner* — Dung H Bui
(74) *Attorney, Agent, or Firm* — Luoh J. Wu; Continent Patent Office LLP

(57) ABSTRACT

A family of optimised cyclones has been surprisingly detected, when incorporating into cyclone calculation the interparticle agglomeration phenomenon, the main cause of the capture of submicrometric particles by greater particles preferably having diameters of 10-20 μm, the family of optimised cyclones having a geometry defined by the following non-dimensional parameters: a/D 0.110-0.170; b/D 0.110-0.170; s/D 0.500-0.540; D e/D 0.100-0.170; h/D 2.200-2.700; H/D 3.900-4.300; D b/D 0.140-0.180, wherein a and b are the sides of the tangential cyclone entrance, which has a rectangular cross-section, and the first of these sides is parallel to the axis of the cyclone, which has a body of height H with a cylindrical upper section having an inner diameter D and a height h, and a lower section with an inverted truncated cone shape with a minor base having the diameter D b; and a cylindrical vortex tube of height s and diameter De (inner dimensions). Global efficiency is maxi- (Continued)

mised in that the efficiency for finer and/or less dense particles, which are the most difficult to capture, is maximised.

11 Claims, 6 Drawing Sheets

(51) Int. Cl.
| | |
|---|---|
| *B01D 45/12* | (2006.01) |
| *B01D 45/16* | (2006.01) |
| *B04C 5/081* | (2006.01) |
| *B04C 5/13* | (2006.01) |
| *B04C 5/14* | (2006.01) |
| *B01D 53/12* | (2006.01) |
| *F23J 15/02* | (2006.01) |
| *C08F 210/16* | (2006.01) |
| *C08F 210/08* | (2006.01) |
| *C08F 2/01* | (2006.01) |

(52) U.S. Cl.
CPC ............ *B04C 5/081* (2013.01); *B04C 5/13* (2013.01); *B04C 5/14* (2013.01); *F23J 15/027* (2013.01); *B01D 2256/00* (2013.01); *B01D 2256/26* (2013.01); *C08F 2/01* (2013.01); *C08F 210/08* (2013.01); *C08F 210/16* (2013.01)

(58) Field of Classification Search
CPC .. B04C 5/14; B04C 5/13; B01D 45/12; B01D 45/16; B01D 53/12; B01D 2256/26; B01D 2256/00; F23J 15/027
See application file for complete search history.

(56) References Cited

U.S. PATENT DOCUMENTS

| | | | | |
|---|---|---|---|---|
| 4,756,890 | A * | 7/1988 | Tang | B01D 53/56 422/168 |
| 5,176,723 | A * | 1/1993 | Liu | B01D 47/05 95/216 |
| 5,362,462 | A * | 11/1994 | Pham | B01D 45/12 423/235 |
| 5,435,975 | A * | 7/1995 | Bastos | B01J 19/14 422/168 |
| 2005/0058924 | A1 * | 3/2005 | Miyakawa | G03G 9/09708 430/108.6 |
| 2006/0130444 | A1 | 6/2006 | Smith et al. | |
| 2006/0140832 | A1 * | 6/2006 | Luomaharju | F23C 10/10 423/215.5 |
| 2008/0264017 | A1 * | 10/2008 | Oh | A47L 9/1608 55/457 |
| 2010/0055193 | A1 * | 3/2010 | Trunk | A61K 9/0075 424/489 |
| 2010/0139492 | A1 * | 6/2010 | Fichman | B01D 45/16 96/319 |
| 2010/0278702 | A1 * | 11/2010 | Leininger | B01D 53/08 423/230 |
| 2012/0167461 | A1 * | 7/2012 | Bentzen | B01D 47/00 48/61 |
| 2015/0111130 | A1 * | 4/2015 | Sala | C04B 35/462 429/488 |

FOREIGN PATENT DOCUMENTS

| | | | | |
|---|---|---|---|---|
| EP | 1925296 A1 * | 5/2008 | | A61K 9/0075 |
| WO | 01/41934 A1 | 6/2001 | | |
| WO | 2011/002426 A2 | 1/2011 | | |

\* cited by examiner

AGGLOMERATING CYCLONE OF THE REVERSE-FLOW TYPE

1—TECHNICAL DOMAIN

The present invention relates to a de-duster of the reverse-flow cyclone type. In addition, the invention relates to methods to remove particles from gases, possibly with dry scrubbing of the same gases.

Cyclones are de-dusters used in many types of industries, with two complimentary ends: removal of particles from gases produced by processes before being emitted to the atmosphere, (ex. exhausts from furnaces and ovens), and recovery of fine particles of high-added value (ex. food, chemical and pharmaceutical industries).

Cyclones have the advantages of low investment and operating costs but the disadvantage of low efficiency for particles below 2-3 µm. Hence, to comply with Portuguese and EU legal emission limits, one has frequently to use more costly de-dusters, such as bag filters and electrostatic precipitators.

Thus, the development of cyclones with collection efficiencies much larger than those attainable by cyclones available in the marketplace, especially for particles below 2-3 µm, has a large potential for industrial application. Several industries (wood, iron & steel, cement, chemical—including the production of nanoparticles—food and pharmaceutical) could benefit from low-cost gas-solid separation devices with enough efficiency to prevent the need to use more expensive equipment (both in capital and operation costs), such as bag filters and electrostatic precipitators referred before. In processes at high temperature and pressure, cyclones are presently the only applicable de-dusters.

Industrial cyclones vary in type, but the most used are of the reverse-flow type, shown schematically FIG. 1. To briefly describe their functioning, the gas enters at section ab and has to describe a descending helical movement, until it reverses direction due to the pressure field (thus the designation of 'reverse-flow') exiting at the top by the vortex pipe of length s and diameter $D_e$. In their descending movement, solid particles are accelerated towards the walls and eventually end up in the cyclone bottom, thus being separated from the gas. In a cyclone, fine particles are those that, in principle, are more difficult to be separated from the transport gas, due to their weaker response to the acceleration imposed by the gas.

Cyclone makers characterize the cyclones by 'families or geometries', characterized in that they present unchanging relations between 7 key dimensions (the ratios of a, b, s, $D_e$, h, H and $D_b$ relative to the cyclone diameter D).

Recently, it was verified that fine particles will agglomerate with larger particles as long as certain project conditions can be met (Paiva et al., 2010). This clustering is hard to predict, involving quite complex models of solid-solid interaction within turbulent flow fields, and correspondingly highly demanding numerical calculations, even for modern and fast computers.

2—PREVIOUS STATE OF THE ART

The first cyclones date from the end of the XIX century, while the predictive models for cyclone modelling have evolved from purely empirical to more fundamental ones. Near the frontier of empirical models versus fundamental ones, there is a theory that can adjust fairly well many of the existing data relative to cyclones both at laboratory, pilot or industrial scales, having been developed by Möthes and Loffler (1988).

A disadvantage of this theory is that it is only a diagnostics one (allowing to fit well the observed experimental data), instead of a prognostics one, viz. it is not good at predicting the behaviour of cyclones of arbitrary geometry under arbitrary conditions, because it depends on the knowledge of the particles' turbulent dispersion coefficient, a fundamental parameter for this theory. A second disadvantage is that this theory completely neglects inter-particle agglomeration (clustering) under turbulence, a phenomenon that occurs in practice.

As the turbulent dispersion coefficient is affected by cyclone geometry, operating conditions and particle size distribution, Salcedo and Coelho (1999) could obtain a semi-empirical formula allowing to estimate this parameter from the above conditions. It was the coupling of global optimization algorithms (Salcedo, 1992), to the fundamental model of Möthes and Loffler (1988), and the predictive model of Salcedo and Coelho (1999), which allowed to reach the cyclones as per patent EP0972572. However, until a few years ago (Paiva et al., 2010), it was not possible to estimate the effect of inter-particle agglomeration in the collection efficiency of reverse-flow cyclones.

The problem of obtaining more efficient cyclone geometries has been tackled, from about 25 years ago, both empirically (trial and error), as demonstrated by the few main works in this field (Li et al., 1988; Schmidt, 1993; Molerus and Gluckler, 1996; Ray et al, 1998; Sun et al., 2005), and by global optimization (Salcedo and Campos, 1999; Ravi et al., 2000; Salcedo and Cândido, 2001; Salcedo and Pinho, 2003; Salcedo and Sousa Mendes, 2003; Salcedo et al., 2004) but always neglecting the phenomena of inter-particle agglomeration. The improvements obtained by empirical methods are usually not very significant, and require too much development time and cost. Global optimization, ignoring inter-particle agglomeration, while allowing obtaining significantly better cyclones (for example, those from patent EP0972572), produces large errors in the prediction of the collection for very fine particles.

Summing up, there is not, up to the present date, any warranty that there exists in the marketplace the best reverse-flow cyclones that have included, in their design, the phenomenon of inter-particle agglomeration, as only a few years ago (Paiva et al., 2010) it was possible to begin to understand this phenomenon in a quantitative way, so that agglomeration could be included in predictive models for cyclone design.

3—INVENTION BASIS—A NEW APPROACH

The present invention is based on the assumption that the comprehension of inter-particle agglomeration in turbulent flows could possibly allow the development of geometries maximizing the collection of fine particles, by maximizing their agglomeration with larger particles, thus maximizing global cyclone efficiency.

The work developed for this invention used the coupling of global optimization techniques, of the type that produced the invention described in patent EP0972572, and in particular those corresponding to the families of cyclones thereof—from now on designated as Cyclop_HE and Cyclop_K—with numerical modelling of inter-particle agglomeration.

With the objective of designing cyclones with much larger collection efficiency than those currently available in the marketplace, including in their design the phenomenon of inter-particle agglomeration, global optimizations were performed in a first phase, simultaneously using the PACyc model (Paiva et al., 2010), to model the agglomeration, and the global optimizer MSGA (Salcedo, 1992), to obtain the best possible geometry. The operating conditions used were both at laboratory, pilot and industrial-scales, and the particle size distributions were several, contained in the data base of Advanced Cyclone Systems, S.A. (Portugal) (from now on designated as ACS). Geometrical constraints were imposed on the optimizer so that the numerical solution could be assigned as a buildable cyclone, and maximum pressure drop was fixed at about 2500 Pa (250 mm w.g.), as it is usual for industrial applications of cyclones. An additional constraint of low sensitivity of the cyclone geometry to the re-entrainment phenomena was added (to prevent emission to the atmosphere of previously captured particles), using the criterion of Kalen and Zenz (Licht, 1980). Thus, the objective was to obtain optimized cyclones with a predicted (theoretical) efficiency matching as close as possible the experimental one.

In a second phase, ratios of geometrical characteristics were identified, in an attempt to identify common traces possibly allowing to define a family of geometries correctly approaching all the experimental data.

4—DESCRIPTION OF THE INVENTION

After detailed analysis of the results, common ratios could be identified that define a new family of reverse-flow cyclones, from now on designated as HR_MK, that maximize efficiency in the presence of inter-particle agglomeration.

The common traces which are characteristic of the cyclones according to the invention are those given by the intervals below, corresponding to each of the seven non-dimensional ratios between the dimensions of the reverse flow cyclones having a tangential entry, of rectangular section of sides a and b, the first parallel to the main cyclone axis; a body of total height H with an upper cylindrical part of internal diameter D and height h and an inverted inferior cone section with a bottom base diameter $D_b$; and a cylindrical vortex finder of height s and diameter $D_e$:

| | |
|---|---|
| a/D | 0.110-0.170; |
| b/D | 0.110-0.170; |
| s/D | 0.500-0.540; |
| $D_e$/D | 0.100-0.170; |
| h/D | 2.200-2.700; |
| H/D | 3.900-4.300; |
| $D_b$/D | 0.140-0.180. |

An example of the geometry of an agglomerating cyclone according to the invention can be seen in FIG. 2.

Table 1 below, where the cyclone according to the invention is designated as HR_MK, gives the values of the 7 geometric ratios obtained—such values being defined by means of the intervals given above—and compares them, as an example, with the characteristic ratios of the optimized geometries according to patent EP0972572.

Table 2 shows, for the geometries available in the literature, including some patents related to cyclones, and also from the database of ACS, the values of the corresponding ratios, for a total of 182 different cases. For example, in Ramachandran et al. (1991) there are 97 geometries of those in Table 2.

TABLE 1

Geometries of optimized families

| Ratio | HR_MK[1] | Cyclop_HE[2] | Cyclop_K[2] |
|---|---|---|---|
| a/D | 0.110-0.170 | 0.270-0.360 | 0.270-0.310 |
| b/D | 0.110-0.170 | 0.270-0.360 | 0.270-0.310 |
| s/D | 0.500-0.540 | 0.330-0.495 | 0.330-0.395 |
| $D_e$/D | 0.100-0.170 | 0.280-0.370 | 0.405-0.430 |
| h/D | 2.200-2.700 | 1.001-1.300 | 2.050-2.260 |
| H/D | 3.900-4.300 | 4.050-4.250 | 3.500-3.700 |
| $D_b$/D | 0.140-0.180 | 0.200-0.300 | 0.250-0.300 |

[1]Optimized including inter-particle agglomeration
[2]Optimized excluding inter-particle agglomeration (EP0972572)

TABLE 2

Geometries of families available in the literature/marketplace

| Model | a/D | b/D | s/D | De/D | h/D | Db/D | H/D | |
|---|---|---|---|---|---|---|---|---|
| 1 | 0.270-0.360 | 0.270-0.360 | 0.330-0.495 | 0.280-0.370 | 1.001-1.300 | 0.200-0.300 | 4.050-4.250 | (a) |
| 2 | 0.500 | 0.200 | 0.500 | 0.500 | 1.500 | 0.376 | 4.000 | |
| 3 | 0.353 | 0.335 | 0.471 | 0.400 | 1.000 | 0.400 | 3.353 | |
| 4 | 0.469 | 0.219 | 0.500 | 0.397 | 1.297 | 0.397 | 3.334 | |
| 5 | 0.470 | 0.220 | 0.500 | 0.400 | 1.300 | 0.400 | 3.333 | |
| 6 | 0.271 | 0.271 | 0.837 | 0.360 | 1.669 | 0.468 | 4.259 | |
| 7 | 0.397 | 0.199 | 0.608 | 0.317 | 0.752 | 0.206 | 3.118 | |
| 8 | 0.400 | 0.200 | 0.549 | 0.319 | 0.797 | 0.270 | 3.142 | |
| 9 | 0.453 | 0.212 | 0.676 | 0.500 | 0.706 | 0.191 | 2.529 | |
| 10 | 0.229 | 0.229 | 0.516 | 0.258 | 0.839 | 0.484 | 1.806 | |
| 11 | 0.189 | 0.189 | 0.495 | 0.196 | 1.030 | 0.400 | 2.344 | |
| 12 | 0.685 | 0.269 | 0.761 | 0.514 | 1.453 | 0.176 | 3.272 | |
| 13 | 0.511 | 0.274 | 0.756 | 0.520 | 1.453 | 0.255 | 3.270 | |
| 14 | 0.522 | 0.273 | 0.759 | 0.520 | 1.455 | 0.255 | 3.273 | |
| 15 | 0.608 | 0.288 | 0.923 | 0.615 | 0.692 | 0.462 | 3.385 | |
| 16 | 0.438 | 0.188 | 1.000 | 0.438 | 1.406 | 0.250 | 5.156 | |
| 17 | 0.334 | 0.167 | 0.852 | 0.334 | 1.325 | 0.334 | 3.580 | |
| 18 | 0.665 | 0.265 | 1.413 | 0.604 | 1.503 | 0.350 | 3.000 | |
| 19 | 0.101 | 0.101 | 0.333 | 0.096 | 1.474 | 0.439 | 2.781 | |
| 20 | 0.331 | 0.166 | 0.397 | 0.397 | 1.414 | 0.199 | 2.785 | |
| 21 | 0.319 | 0.319 | 0.775 | 0.206 | 0.906 | 0.460 | 3.969 | |
| 22 | 0.534 | 0.151 | 0.732 | 0.232 | 0.695 | 0.332 | 3.356 | |

TABLE 2-continued

Geometries of families available in the literature/marketplace

| Model | a/D | b/D | s/D | De/D | h/D | Db/D | H/D | |
|---|---|---|---|---|---|---|---|---|
| 23 | 0.627 | 0.247 | 1.254 | 0.556 | 1.530 | 0.177 | 3.599 | |
| 24 | 0.500 | 0.250 | 0.625 | 0.500 | 2.000 | 0.250 | 4.000 | |
| 25 | 0.502 | 0.249 | 1.505 | 0.499 | 2.006 | 0.371 | 4.013 | |
| 26 | 0.500 | 0.250 | 1.481 | 0.500 | 2.000 | 0.167 | 4.019 | |
| 27 | 0.500 | 0.250 | 1.481 | 0.500 | 2.000 | 0.167 | 4.019 | |
| 28 | 0.499 | 0.261 | 1.502 | 0.496 | 4.002 | 0.235 | 4.002 | |
| 29 | 0.499 | 0.261 | 1.502 | 0.496 | 4.002 | 0.235 | 4.002 | |
| 30 | 0.445 | 0.223 | 1.000 | 0.444 | 1.397 | 0.413 | 3.905 | |
| 31 | 0.448 | 0.231 | 0.996 | 0.448 | 1.395 | 0.403 | 3.865 | |
| 32 | 0.697 | 0.250 | 0.888 | 0.526 | 1.224 | 0.263 | 4.526 | |
| 33 | 0.471 | 0.471 | 0.804 | 0.358 | 1.413 | 0.138 | 3.139 | |
| 34 | 0.447 | 0.096 | 0.500 | 0.367 | 0.545 | 0.100 | 1.469 | |
| 35 | 0.400 | 0.200 | 0.875 | 0.436 | 0.875 | 0.125 | 3.500 | |
| 36 | 0.300 | 0.200 | 0.783 | 0.444 | 0.800 | 0.083 | 3.333 | |
| 37 | 0.302 | 0.198 | 0.710 | 0.400 | 0.794 | 0.317 | 2.825 | |
| 38 | 0.461 | 0.202 | 0.459 | 0.279 | 1.303 | 0.401 | 3.353 | |
| 39 | 0.636 | 0.275 | 0.630 | 0.472 | 1.195 | 0.398 | 2.635 | |
| 40 | 0.223 | 0.223 | 1.000 | 0.500 | 2.167 | 0.333 | 3.083 | |
| 41 | 0.208 | 0.208 | 0.900 | 0.318 | 0.900 | 0.381 | 2.790 | |
| 42 | 0.653 | 0.286 | 1.735 | 0.510 | 1.806 | 0.408 | 3.949 | |
| 43 | 0.638 | 0.320 | 0.637 | 0.477 | 1.326 | 0.387 | 2.643 | |
| 44 | 0.271 | 0.271 | 0.750 | 0.471 | 0.833 | 0.233 | 3.000 | |
| 45 | 0.270 | 0.270 | 0.747 | 0.470 | 0.798 | 0.295 | 2.904 | |
| 46 | 0.249 | 0.249 | 0.852 | 0.391 | 0.899 | 0.280 | 2.937 | |
| 47 | 0.198 | 0.198 | 2.009 | 0.670 | 2.232 | 0.670 | 3.125 | |
| 48 | 0.301 | 0.301 | 0.508 | 0.340 | 1.347 | 0.340 | 3.640 | |
| 49 | 0.167 | 0.083 | 0.417 | 0.167 | 1.500 | 0.500 | 3.531 | |
| 50 | 0.139 | 0.139 | 0.993 | 0.235 | 2.085 | 0.118 | 3.623 | |
| 51 | 0.390 | 0.300 | 0.496 | 0.390 | 1.000 | 0.400 | 3.000 | |
| 52 | 0.500 | 0.250 | 1.090 | 0.300 | 1.090 | 0.381 | 3.000 | |
| 53 | 0.247 | 0.247 | 0.447 | 0.282 | 4.124 | 0.182 | 5.000 | |
| 54 | 0.222 | 0.222 | 0.328 | 0.333 | 0.853 | 0.500 | 2.723 | |
| 55 | 0.994 | 0.147 | 1.123 | 0.448 | 3.241 | 0.376 | 5.562 | |
| 56 | 0.394 | 0.303 | 0.571 | 0.394 | 0.861 | 0.429 | 1.858 | |
| 57 | 0.322 | 0.201 | 0.503 | 0.497 | 1.678 | 0.658 | 2.852 | |
| 58 | 0.548 | 0.246 | 1.173 | 0.550 | 2.173 | 0.533 | 3.573 | |
| 59 | 0.816 | 0.204 | 1.259 | 0.646 | 1.895 | 0.204 | 3.799 | |
| 60 | 0.408 | 0.282 | 0.652 | 0.565 | 1.013 | 0.392 | 2.922 | |
| 61 | 0.501 | 0.232 | 0.626 | 0.357 | 1.376 | 0.429 | 4.252 | |
| 62 | 0.461 | 0.257 | 1.122 | 0.498 | 1.146 | 0.024 | 2.580 | |
| 63 | 0.704 | 0.306 | 0.822 | 0.593 | 1.375 | 0.407 | 2.699 | |
| 64 | 0.500 | 0.250 | 0.625 | 0.500 | 2.000 | 0.250 | 4.000 | |
| 65 | 0.500 | 0.200 | 0.500 | 0.500 | 1.500 | 0.375 | 4.000 | |
| 66 | 0.440 | 0.210 | 0.500 | 0.400 | 1.400 | 0.400 | 3.900 | |
| 67 | 0.500 | 0.230 | 0.654 | 0.523 | 0.654 | 0.317 | 3.164 | |
| 68 | 0.400 | 0.150 | 0.400 | 0.400 | 1.100 | 0.325 | 4.500 | |
| 69 | 0.333 | 0.167 | 0.752 | 0.333 | 1.333 | 0.333 | 3.333 | |
| 70 | 0.350 | 0.300 | 0.350 | 0.390 | 1.500 | 0.375 | 5.000 | |
| 71 | 0.750 | 0.380 | 0.880 | 0.750 | 1.500 | 0.380 | 4.000 | |
| 72 | 0.270–0.310 | 0.270–0.310 | 0.330–0.395 | 0.405–0.430 | 2.050–2.260 | 0.250–0.300 | 3.500–3.700 | (a) |
| 73 | 0.265 | 0.265 | 0.332 | 0.349 | 2.500 | 0.349 | 5.000 | |
| 74 | 0.208 | 0.208 | 0.900 | 0.318 | 0.900 | 0.381 | 2.790 | |
| 75 | 0.394 | 0.303 | 0.571 | 0.394 | 0.861 | 0.429 | 1.858 | |
| 76 | 0.304 | 0.184 | 0.814 | 0.259 | 1.019 | 0.250 | 4.779 | |
| 77 | 0.533 | 0.133 | 0.733 | 0.333 | 0.693 | 0.333 | 2.580 | |
| 78 | 0.400 | 0.100 | 0.733 | 0.333 | 0.693 | 0.333 | 2.580 | |
| 79 | 0.500 | 0.250 | 1.060 | 0.500 | 1.990 | 0.250 | 3.980 | |
| 80 | 0.380 | 0.190 | 1.130 | 0.310 | 1.810 | 0.380 | 4.310 | |
| 81 | 0.533 | 0.233 | 1.600 | 0.500 | 2.133 | 0.267 | 4.267 | |
| 82 | 0.533 | 0.156 | 1.600 | 0.500 | 2.133 | 0.267 | 4.267 | |
| 83 | 0.533 | 0.111 | 1.600 | 0.500 | 2.133 | 0.267 | 4.267 | |
| 84 | 0.500 | 0.148 | 0.500 | 0.313 | 1.625 | 0.313 | 2.375 | |
| 85 | 0.500 | 0.148 | 0.500 | 0.500 | 1.625 | 0.313 | 2.375 | |
| 86 | 1.000 | 0.250 | 0.500 | 0.313 | 1.125 | 0.313 | 1.688 | |
| 87 | 1.000 | 0.250 | 0.500 | 0.500 | 1.125 | 0.313 | 1.688 | |
| 88 | 0.250 | 0.125 | 1.500 | 0.500 | 2.000 | 0.250 | 4.000 | |
| 89 | 0.500 | 0.250 | 1.500 | 0.500 | 2.000 | 0.250 | 4.000 | |
| 90 | 0.600 | 0.250 | 1.500 | 0.500 | 2.000 | 0.250 | 4.000 | |
| 91 | 0.667 | 0.133 | 0.400 | 0.333 | 1.133 | 0.250 | 1.967 | |
| 92 | 0.367 | 0.117 | 0.733 | 0.250 | 0.950 | 0.250 | 2.200 | |
| 93 | 0.283 | 0.150 | 0.600 | 0.500 | 0.700 | 0.200 | 1.450 | |
| 94 | 0.288 | 0.151 | 0.613 | 0.500 | 0.700 | 0.200 | 1.463 | |
| 95 | 0.293 | 0.150 | 0.600 | 0.500 | 0.700 | 0.200 | 1.475 | |
| 96 | 0.283 | 0.067 | 0.600 | 0.500 | 0.700 | 0.200 | 1.450 | |
| 97 | 0.142 | 0.150 | 0.600 | 0.500 | 0.700 | 0.200 | 1.450 | |

TABLE 2-continued

Geometries of families available in the literature/marketplace

| Model | a/D | b/D | s/D | De/D | h/D | Db/D | H/D |
|---|---|---|---|---|---|---|---|
| 98 | 0.283 | 0.150 | 0.600 | 0.667 | 0.700 | 0.200 | 1.450 |
| 99 | 0.283 | 0.067 | 0.600 | 0.333 | 0.700 | 0.200 | 1.450 |
| 100 | 0.283 | 0.150 | 0.600 | 0.500 | 0.700 | 0.200 | 1.158 |
| 101 | 0.283 | 0.094 | 0.600 | 0.500 | 0.700 | 0.200 | 1.158 |
| 102 | 0.283 | 0.094 | 0.600 | 0.667 | 0.700 | 0.200 | 1.158 |
| 103 | 0.283 | 0.150 | 0.600 | 0.333 | 0.700 | 0.200 | 1.158 |
| 104 | 0.283 | 0.150 | 0.600 | 0.667 | 0.700 | 0.200 | 1.158 |
| 105 | 0.283 | 0.150 | 0.600 | 0.333 | 0.700 | 0.200 | 1.450 |
| 106 | 0.113 | 0.150 | 0.600 | 0.500 | 0.700 | 0.200 | 1.450 |
| 107 | 0.208 | 0.150 | 0.600 | 0.500 | 0.700 | 0.200 | 1.450 |
| 108 | 0.283 | 0.094 | 0.600 | 0.500 | 0.700 | 0.200 | 1.450 |
| 109 | 0.283 | 0.067 | 0.400 | 0.333 | 0.700 | 0.200 | 1.450 |
| 110 | 0.292 | 0.208 | 0.556 | 0.417 | 0.667 | 0.140 | 2.056 |
| 111 | 0.393 | 0.119 | 0.667 | 0.476 | 0.655 | 0.141 | 1.607 |
| 112 | 0.500 | 0.200 | 0.500 | 0.500 | 1.500 | 0.375 | 4.000 |
| 113 | 0.620 | 0.230 | 1.170 | 0.500 | 1.330 | 0.250 | 3.180 |
| 114 | 0.667 | 0.333 | 0.893 | 0.573 | 1.307 | 0.250 | 3.280 |
| 115 | 0.609 | 0.318 | 0.909 | 0.564 | 1.364 | 0.250 | 2.727 |
| 116 | 0.561 | 0.211 | 0.763 | 0.513 | 0.561 | 0.531 | 2.666 |
| 117 | 0.526 | 0.156 | 0.632 | 0.434 | 0.632 | 0.316 | 3.579 |
| 118 | 0.538 | 0.162 | 0.673 | 0.435 | 0.681 | 0.404 | 3.373 |
| 119 | 0.527 | 0.149 | 0.636 | 0.400 | 0.636 | 0.345 | 2.909 |
| 120 | 0.486 | 0.268 | 0.568 | 0.405 | 0.649 | 0.405 | 2.335 |
| 121 | 0.267 | 0.267 | 0.390 | 0.300 | 0.501 | 0.300 | 2.486 |
| 122 | 0.900 | 0.100 | 0.967 | 0.500 | 1.035 | 0.500 | 2.217 |
| 123 | 0.900 | 0.100 | 0.967 | 0.500 | 1.035 | 0.500 | 3.467 |
| 124 | 0.900 | 0.100 | 0.967 | 0.500 | 1.035 | 0.500 | 5.967 |
| 125 | 0.900 | 0.100 | 0.967 | 0.500 | 1.035 | 0.500 | 10.970 |
| 126 | 0.900 | 0.200 | 0.967 | 0.500 | 1.035 | 0.500 | 2.217 |
| 127 | 0.900 | 0.200 | 0.967 | 0.500 | 1.035 | 0.500 | 3.467 |
| 128 | 0.900 | 0.200 | 0.967 | 0.500 | 1.035 | 0.500 | 5.967 |
| 129 | 0.900 | 0.200 | 0.967 | 0.500 | 1.035 | 0.500 | 10.970 |
| 130 | 0.900 | 0.300 | 0.967 | 0.500 | 1.035 | 0.500 | 2.217 |
| 131 | 0.900 | 0.300 | 0.967 | 0.500 | 1.035 | 0.500 | 3.467 |
| 132 | 0.900 | 0.300 | 0.967 | 0.500 | 1.035 | 0.500 | 5.967 |
| 133 | 0.900 | 0.300 | 0.967 | 0.500 | 1.035 | 0.500 | 10.970 |
| 134 | 0.900 | 0.400 | 0.967 | 0.500 | 1.035 | 0.500 | 2.217 |
| 135 | 0.900 | 0.400 | 0.967 | 0.500 | 1.035 | 0.500 | 3.467 |
| 136 | 0.900 | 0.400 | 0.967 | 0.500 | 1.035 | 0.500 | 5.967 |
| 137 | 0.900 | 0.400 | 0.967 | 0.500 | 1.035 | 0.500 | 10.970 |
| 138 | 0.900 | 0.100 | 0.967 | 0.333 | 1.035 | 0.333 | 1.801 |
| 139 | 0.900 | 0.100 | 0.967 | 0.333 | 1.035 | 0.333 | 2.634 |
| 140 | 0.900 | 0.100 | 0.967 | 0.333 | 1.035 | 0.333 | 4.301 |
| 141 | 0.900 | 0.200 | 0.967 | 0.333 | 1.035 | 0.333 | 1.801 |
| 142 | 0.900 | 0.200 | 0.967 | 0.333 | 1.035 | 0.333 | 2.634 |
| 143 | 0.900 | 0.200 | 0.967 | 0.333 | 1.035 | 0.333 | 4.301 |
| 144 | 0.900 | 0.300 | 0.967 | 0.333 | 1.035 | 0.333 | 1.801 |
| 145 | 0.900 | 0.300 | 0.967 | 0.333 | 1.035 | 0.333 | 2.634 |
| 146 | 0.900 | 0.300 | 0.967 | 0.333 | 1.035 | 0.333 | 4.301 |
| 147 | 0.900 | 0.400 | 0.967 | 0.333 | 1.035 | 0.333 | 1.801 |
| 148 | 0.900 | 0.400 | 0.967 | 0.333 | 1.035 | 0.333 | 2.634 |
| 149 | 0.900 | 0.400 | 0.967 | 0.333 | 1.035 | 0.333 | 4.301 |
| 150 | 0.900 | 0.100 | 0.967 | 0.250 | 1.035 | 0.250 | 1.592 |
| 151 | 0.900 | 0.100 | 0.967 | 0.250 | 1.035 | 0.250 | 2.217 |
| 152 | 0.900 | 0.100 | 0.967 | 0.250 | 1.035 | 0.250 | 3.467 |
| 153 | 0.900 | 0.200 | 0.967 | 0.250 | 1.035 | 0.250 | 1.592 |
| 154 | 0.900 | 0.200 | 0.967 | 0.250 | 1.035 | 0.250 | 2.217 |
| 155 | 0.900 | 0.200 | 0.967 | 0.250 | 1.035 | 0.250 | 3.467 |
| 156 | 0.900 | 0.300 | 0.967 | 0.250 | 1.035 | 0.250 | 1.592 |
| 157 | 0.900 | 0.300 | 0.967 | 0.250 | 1.035 | 0.250 | 2.217 |
| 158 | 0.900 | 0.300 | 0.967 | 0.250 | 1.035 | 0.250 | 3.467 |
| 159 | 0.900 | 0.400 | 0.967 | 0.250 | 1.035 | 0.250 | 1.592 |
| 160 | 0.900 | 0.400 | 0.967 | 0.250 | 1.035 | 0.250 | 2.217 |
| 161 | 0.555 | 0.400 | 0.967 | 0.250 | 1.035 | 0.250 | 3.467 |
| 162 | 0.553 | 0.162 | 0.543 | 0.433 | 0.684 | 0.384 | 3.263 |
| 163 | 0.553 | 0.161 | 0.552 | 0.431 | 0.681 | 0.383 | 3.245 |
| 164 | 0.553 | 0.161 | 0.561 | 0.432 | 0.682 | 0.382 | 3.255 |
| 165 | 0.440 | 0.210 | 0.500 | 0.400 | 1.400 | 0.400 | 3.900 |
| 166 | 0.500 | 0.250 | 0.600 | 0.500 | 1.750 | 0.400 | 3.750 |
| 167 | 0.557 | 0.331 | 0.962 | 0.541 | 3.350 | 0.287 | 5.939 |
| 168 | 0.575 | 0.230 | 0.584 | 0.575 | 0.750 | 0.480 | 3.510 |
| 169 | 0.573 | 0.223 | 0.580 | 0.575 | 0.750 | 0.477 | 3.460 |
| 170 | 0.372 | 0.186 | 0.541 | 0.514 | 0.743 | 0.253 | 2.095 |
| 171 | 0.494 | 0.247 | 0.740 | 0.407 | 2.662 | 0.586 | 3.961 |
| 172 | 0.375 | 0.188 | 1.125 | 0.313 | 1.813 | 0.375 | 4.313 |
| 173 | 0.500 | 0.200 | 0.500 | 0.500 | 1.500 | 0.375 | 4.000 |

TABLE 2-continued

Geometries of families available in the literature/marketplace

| Model | a/D | b/D | s/D | De/D | h/D | Db/D | H/D | |
|---|---|---|---|---|---|---|---|---|
| 174 | 0.500 | 0.300 | 0.558 | 0.333 | 3.500 | 0.375 | 6.000 | |
| 175 | 0.375 | 0.200 | 3.052 | 0.583 | 3.500 | 1.000 | 6.000 | |
| 176 | 0.375 | 0.200 | 2.865 | 0.583 | 3.500 | 0.688 | 6.000 | |
| 177 | 0.500 | 0.300 | 2.073 | 0.333 | 3.500 | 1.000 | 6.000 | |
| 178 | 0.500 | 0.202 | 0.623 | 0.500 | 2.623 | 0.447 | 4.018 | (b) |
| 179 | 1.000 | 0.201 | 0.467 | 0.375 | 2.007 | 0.336 | 4.013 | (b) |
| 180 | 0.513 | 0.201 | 0.526 | 0.375 | 2.007 | 0.336 | 4.013 | (b) |
| 181 | 0.513 | 0.201 | 0.526 | 0.375 | 3.007 | 0.336 | 5.013 | (b) |
| 182 | 0.274–0.500 | 0.141–0.258 | 0.250–0.750 | 0.300–0.700 | 0.160–1.000 | >0.640 | 0.800–2.000 | (c) |

(a) EP0972572;
(b) EP1487588;
(c) EP0564992

After a detailed statistical analysis on the occurrence of violations to the ratios imposed in Tab.1 for the geometry HR_MK, on can see that there are 37% (67 geometries) that violate a single ratio and 14% (25 geometries) that violate exactly two ratios, as it can be seen in Tables 3 and 4. By violation of a ratio, it is understood, in the present patent specification, that there exists at least one cyclone from the previous state of the art, which, for that ratio (or non-dimensional parameter), has at least one value that belongs to the characteristic interval specified in Table 1 for the cyclones according to the invention (HR_MK), with respect to that ratio.

There is no geometry that violates more than 2 ratios, which makes the family HR_MK quite different from the cyclones previously known. This is not astonishing, because no optimized reverse-flow cyclones were ever obtained before including in their design the phenomenon of inter-particle agglomeration. Surprising, yes, was the fact that common traces (traits) could be recognized for this new family, because nothing would guarantee that such a possibility existed, given that the high complexity of inter-particle interaction could be so closely related to each concrete case (geometry included), that it would be impossible to obtain links of general traces.

As main characteristics that distinguish the optimized family according to the present invention, from the other families, one can point out the following ones:
  Gas entry, vortex tube and solids discharge more narrow;
  Longer cylindrical upper body and shorter cone lower body.

TABLE 3

Identification of geometries that violate a single ratio of HR MK

Number of violated ratios = 1

| Ratio/Geometry | a/D | b/D | s/D | De/D | h/D | Db/D | H/D |
|---|---|---|---|---|---|---|---|
| 4 | X | | | | | | |
| 5 | X | | | | | | |
| 6 | | | | | | | X |
| 10 | | | X | | | | |
| 11 | | | X | | | | |
| 12 | | | | | | X | |
| 17 | | X | | | | | |
| 19 | | | | X | | | |
| 20 | | X | | | | | |
| 21 | | | | | | X | |
| 22 | | X | | | | | |
| 23 | | | | | X | | |
| 24 | | | | | | | X |

TABLE 3-continued

Identification of geometries that violate a single ratio of HR MK

Number of violated ratios = 1

| Ratio/Geometry | a/D | b/D | s/D | De/D | h/D | Db/D | H/D |
|---|---|---|---|---|---|---|---|
| 25 | | | | | | | X |
| 28 | | | | | | | X |
| 29 | | | | | | | X |
| 30 | | | | | | | X |
| 31 | | | | | | | X |
| 33 | | | | | | X | |
| 34 | | X | | | | | |
| 40 | | | | X | | | |
| 42 | | | | | | | X |
| 47 | | | | X | | | |
| 48 | | X | | | | | |
| 51 | | X | | | | | |
| 53 | | | | | X | | |
| 55 | X | | | | | | |
| 57 | | X | | | | | |
| 58 | | | | | X | | |
| 61 | | | | | | | X |
| 64 | | | | | | | X |
| 68 | | X | | | | | |
| 69 | | X | | | | | |
| 71 | | | | | | | X |
| 72 | | | | | X | | |
| 73 | | | | | | X | |
| 77 | X | | | | | | |
| 79 | | | | | | | X |
| 81 | | | | | | | X |
| 83 | | | | | | | X |
| 86 | | X | | | | | |
| 87 | | X | | | | | |
| 89 | | | | | | | X |
| 90 | | | | | | | X |
| 91 | X | | | | | | |
| 92 | X | | | | | | |
| 93 | X | | | | | | |
| 94 | X | | | | | | |
| 95 | X | | | | | | |
| 98 | X | | | | | | |
| 100 | X | | | | | | |
| 103 | X | | | | | | |
| 104 | X | | | | | | |
| 105 | X | | | | | | |
| 107 | X | | | | | | |
| 117 | X | | | | | | |
| 118 | X | | | | | | |
| 119 | X | | | | | | |
| 140 | | | | | | | X |
| 143 | | | | | | | X |
| 146 | | | | | | | X |
| 149 | | | | | | | X |
| 163 | X | | | | | | |
| 164 | X | | | | | | |

TABLE 3-continued

Identification of geometries that violate a single ratio of HR_MK

Number of violated ratios = 1

| Ratio/Geometry | a/D | b/D | s/D | De/D | h/D | Db/D | H/D |
|---|---|---|---|---|---|---|---|
| 170 | | | X | | | | |
| 179 | | | | | | | X |
| 181 | | | X | | | | |

X = violation of a single ratio

TABLE 4

Identification of geometries that violate two ratios of HR_MK

Number of violated ratios = 2

| Ratio/Geometry | a/D | b/D | s/D | De/D | h/D | Db/D | H/D |
|---|---|---|---|---|---|---|---|
| 1 | | | X | | | | X |
| 2 | | | X | | | | X |
| 26 | | | | | | X | X |
| 27 | | | | | | X | X |
| 49 | X | | | X | | | |
| 50 | X | X | | | | | |
| 65 | | | X | | | | X |
| 66 | | | X | | | | X |
| 82 | | X | | | | | X |
| 83 | | X | | | | | X |
| 84 | | X | X | | | | |
| 85 | | X | X | | | | |
| 88 | | X | | | | | X |
| 97 | X | X | | | | | |
| 106 | X | X | | | | | |
| 111 | | X | | | X | | |
| 112 | | | X | | | | X |
| 162 | | X | X | | | | |
| 165 | | | X | | | | X |
| 171 | | | | X | | | X |
| 173 | | X | | | | | X |
| 178 | | | | | | X | X |
| 180 | | | X | | | | X |
| 182 | X | X | | | | | |

X = violation of one ratio

The present patent application refers to a geometry of reverse-flow cyclones that was numerically optimized simultaneously considering inter-particle agglomeration and global optimization. As it can be seen from the above, the family of cyclones according to the invention is quite distinct from those existing in the marketplace and in the scientific literature, having for that being analysed 182 different geometries. The cyclone family according to the invention is of maximum efficiency significantly larger than the one of the cyclones disclosed in patent EP0972572, which had already been demonstrated to be significantly more efficient than other reverse-flow cyclones usually referred to as being of the high-efficiency type.

The present invention also relates to a de-dusting method where the flue gases pass through a cyclone according to the present invention.

According to a particular embodiment, de-dusting can be accompanied by the dry removal of gases, by introducing an appropriate reactant (sorbent) in powder form, upstream of the cyclone according to the invention.

The invention also relates to the use of the method and of the cyclone, according to the invention, for the cleaning of acid gases. According to a particular embodiment, the acid gases, are HCl (hydrogen chloride), HF (hydrogen fluoride), $SO_2$ (sulphur dioxide) and/or $NO_x$ (nitrogen oxides).

Following another particular embodiment, the invention is also related to the use of the disclosed method and cyclone, for the removal of fine particulate matter from diesel exhaust fumes.

5—BRIEF DESCRIPTION OF FIGURES

6—SPECIFIC EXAMPLES

To confirm the simulation results obtained, four different sized cyclones were tested according to the invention (HR_MK), with diameters of 135, 460, 700 and 1400 mm. The obtained efficiencies with different particles and particle size distributions were compared with those obtained with similar sized cyclones of the type Cyclop_HE (the best numerically optimized prior to the present invention), for the capture of very fine powders, with very low density or with both of these characteristics. In all cases, a significant increase in the capture efficiencies of fine particles was observed, and consequently, of the global efficiency.

The comparison between the geometries HR_MK and Cyclop_HE was also done for a case of denser particles and without any appreciable size fraction below 1 micron, end even below 10 micron, where, in this case, the geometry Cyclop_HE was better.

6a—HR_MK of 135 mm

Figure 1:
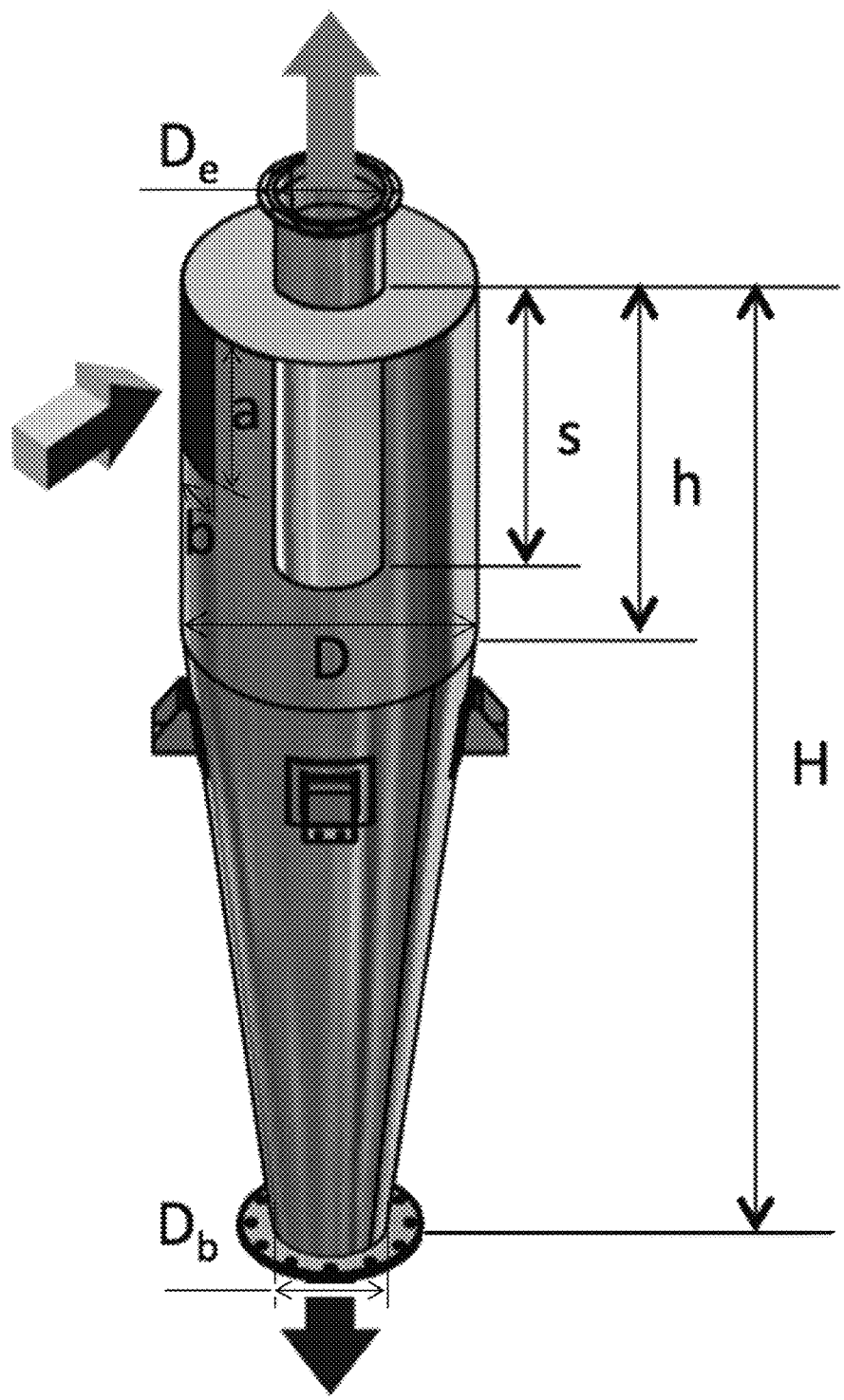
FIG. 1 represents a reverse-flow cyclone and shows the linear dimensions that are the basis for calculating the non-dimensional ratios referred before, dimensions which were already described in detail, as well as the flows entering and exiting the cyclone, respectively the dirty gas (GS) the cleaned gas (GL) and the captured particles (P).
Figure 2:
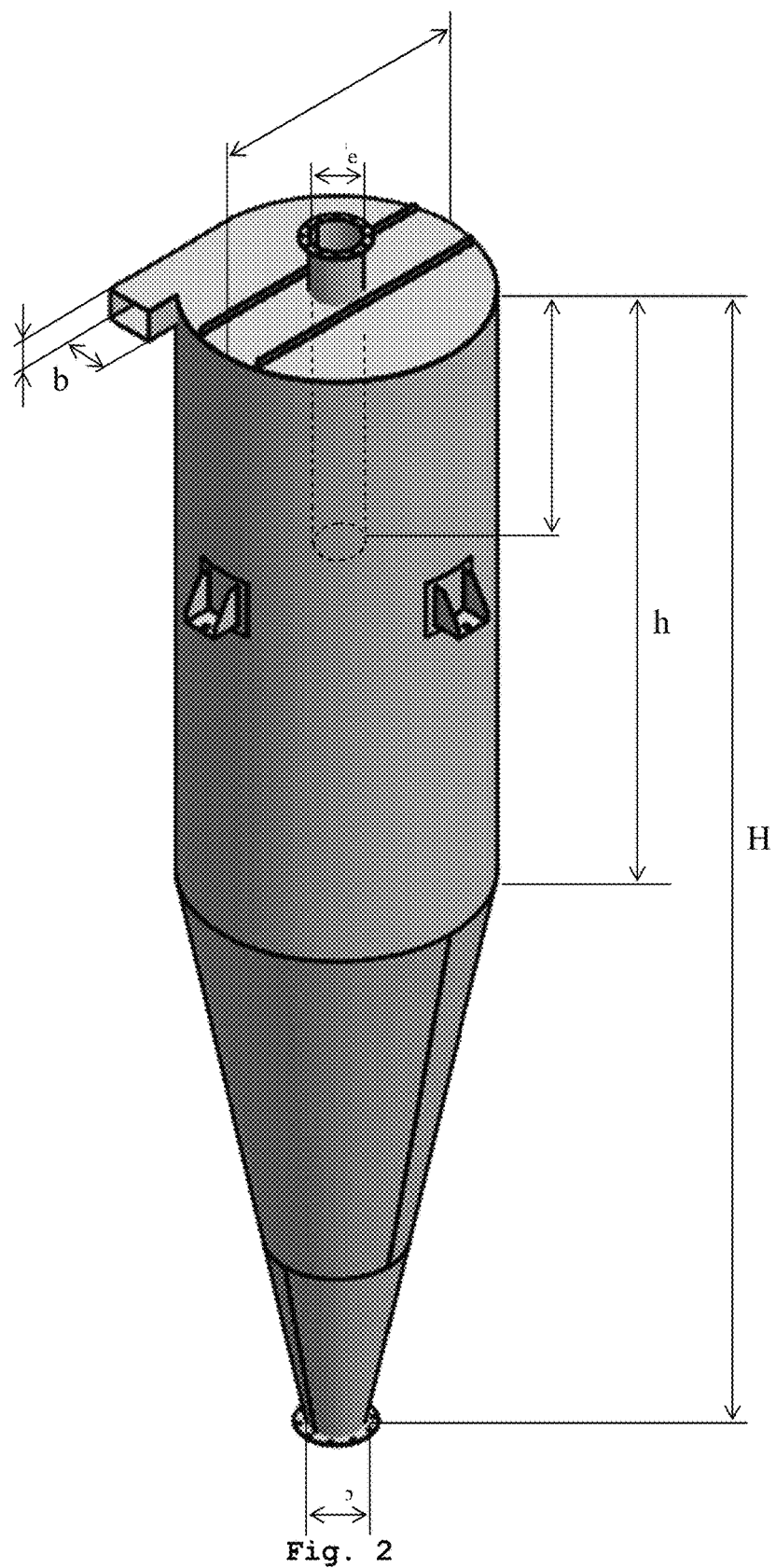
FIG. 2 represents a typical agglomerating cyclone according to the invention (HR_MK).
Figure 3:
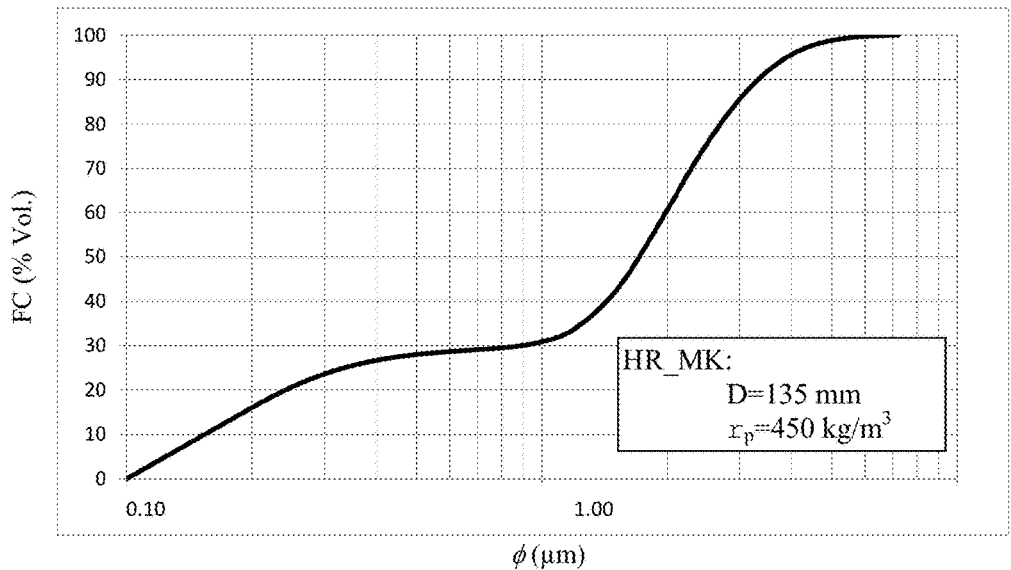
FIG. 3 represents a graph with the particle size distribution used in a small cyclone according to the invention (HR_MK) of 135 mm internal diameter (D) for a very low particle density ($\rho_p$) of 450 kg/m$^3$. The ordinate axis represents the cumulative undersize frequency (FC) in percentage (by Volume) and the abscissa axis the diameter ($\phi$) of the particles, in microns.
Figure 4:
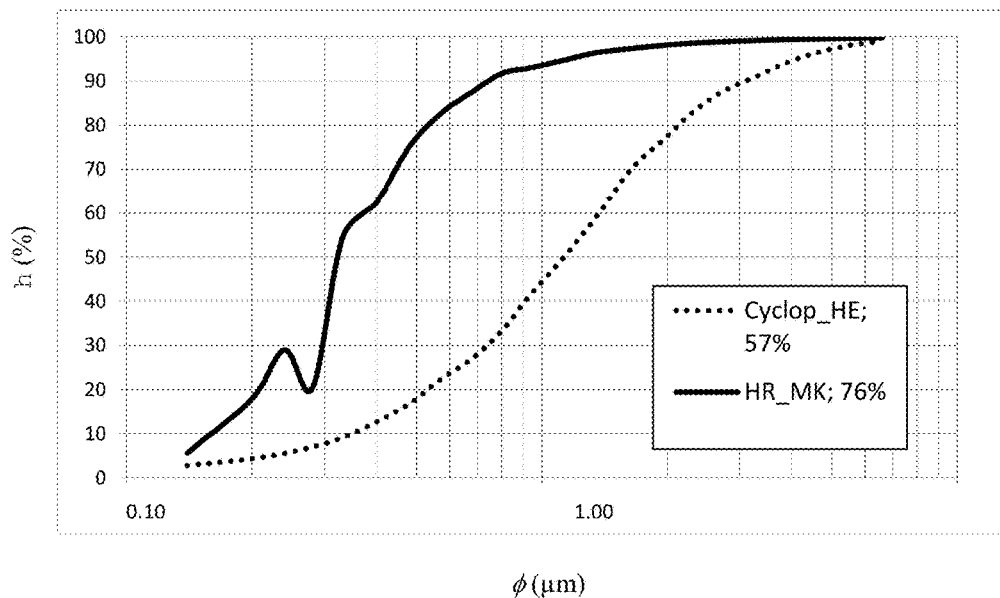
FIG. 4 represents a graph where the grade-efficiencies are compared for the geometry of the invention (HR_MK) and for the geometry Cyclop_HE (for the particles of FIG. 3). The ordinate axis represents the efficiency ($\eta$) and the abscissa axis the diameter ($\phi$) of the particles, in microns.

FIG. 3 shows the test particle size distribution for a cyclone of the present invention (HR_MK) of 135 mm diameter, for non-porous particles but of very low density (true density, obtained by helium pycnometry, of 450 kg/m$^3$). The remaining operating conditions were: gas flow-rate of 40 m$^3$/h@165° C. and inlet concentration of 530 mg/m$^3$. FIG. 4 compares the performance of the cyclones HR_MK and Cyclop_HE (EP0972572), for an equivalent pressure drop (2.6 kPa). It should be noted that low particle density enhances inter-particle agglomeration by producing cohesive particle collisions (Paiva et al., 2010). Global efficiencies were respectively of 57 and 76% for the geometry Cyclop_HE and for the optimized HR_MK, i.e., emissions of the optimized cyclone according to the present invention are about 56% lower than those of the Cyclop_HE.

6b—HR_MK of 460 mm

Figure 5:
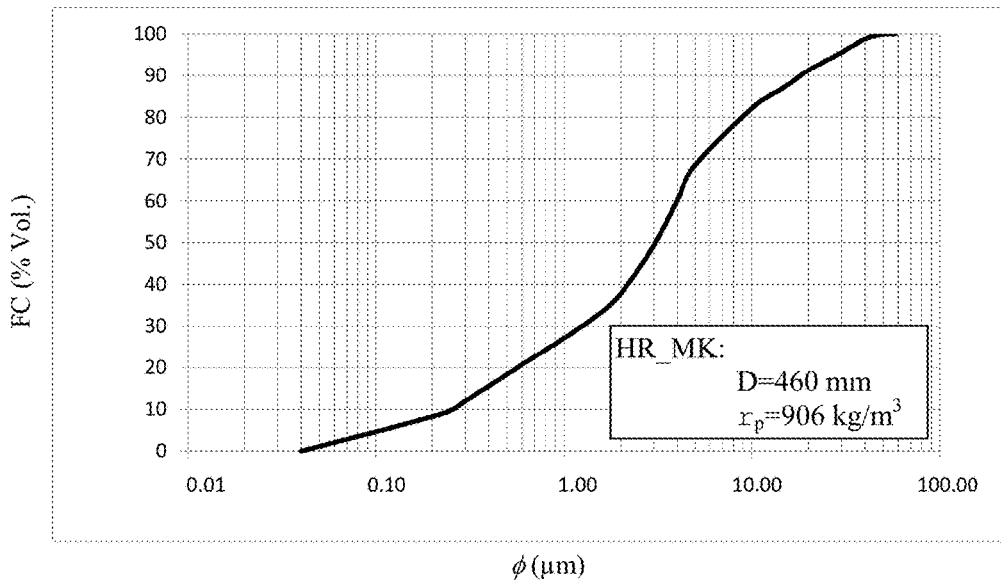
FIG. 5 represents a graph with the particle size distribution used in a cyclone according to the invention (HR_MK) of 460 mm internal diameter (D) for a particle density ($\rho_p$) of 906 kg/m$^3$. The axes are identical to those of FIG. 3.
Figure 6:
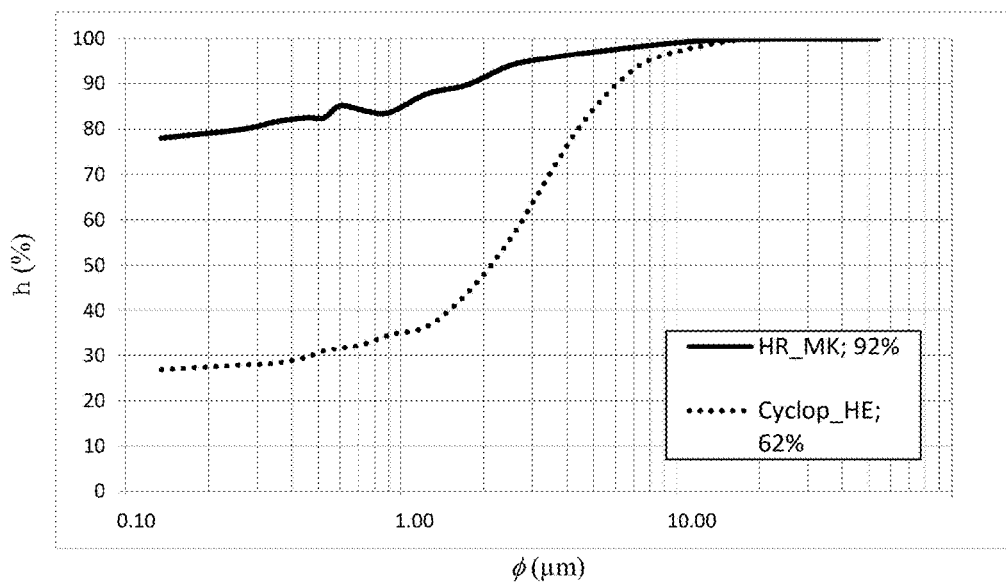
FIG. 6 represents a graph where the grade-efficiencies are compared for the geometry of the invention (HR_MK) and for the geometry Cyclop_HE (for the particles of FIG. 5). The axes are identical to those of FIG. 4.

FIG. 5 shows the test particle size distribution for a cyclone of the present invention (HR_MK) of 460 mm de diameter, for particles with a skeletal density (including the intra-particle pores) obtained by mercury pycnometry, of 906 kg/m$^3$) (for non-porous particles the true density coincides with the skeletal density, but for porous particles the skeletal density is always lower than the true density and is the one that should be used in cyclone modelling). The remaining operating conditions were: gas flow-rate of 310 m$^3$/h@30° C. and inlet concentration of 430 mg/m$^3$. FIG. 6 compares the performance of the cyclones HR_MK and Cyclop_HE (EP0972572), for an equivalent pressure drop (1.8 kPa). Global efficiencies were respectively of 62 and 92% for the geometry Cyclop_HE and for the optimized HR_MK, i.e., emissions of the optimized cyclone according to the present invention are about 78% lower than those of the Cyclop_HE.

6c—HR_MK of 700 mm

Figure 7:
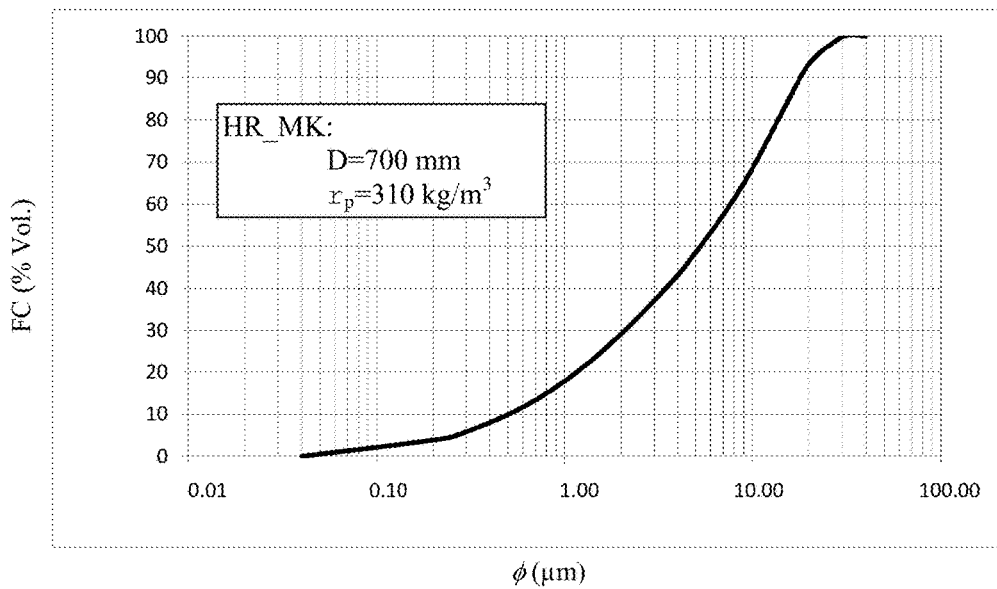
FIG. 7 represents a graph with the particle size distribution used in a cyclone according to the invention (HR_MK) of 700 mm internal diameter (D) for a very low particle density ($\rho_p$) of 310 kg/m$^3$. The axes are identical to those of FIG. 3.
Figure 8:
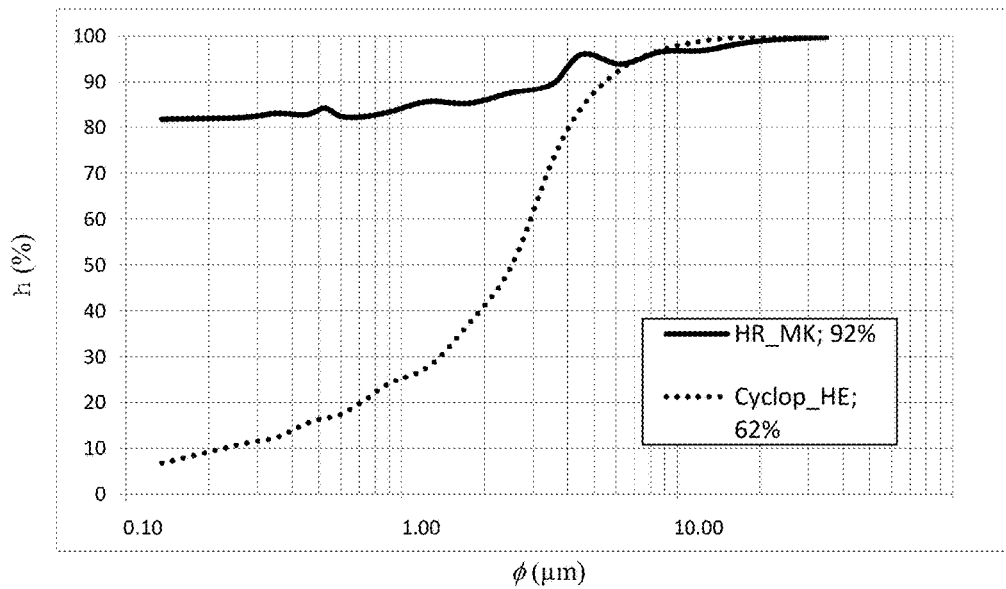
FIG. 8 represents a graph where the grade-efficiencies are compared for the geometry of the invention (HR_MK) and for the geometry Cyclop_HE (for the particles of FIG. 7). The axes are identical to those of FIG. 4.

FIG. 7 shows the test particle size distribution for a cyclone of the present invention (HR_MK) of 700 mm de diameter, for particles with a skeletal density of 310 kg/m$^3$. The remaining operating conditions were: gas flow-rate of 640 m$^3$/h@20° C. and inlet concentration of 360 mg/m$^3$. FIG. 8 compares the performance of the cyclones HR_MK and Cyclop_HE, for an equivalent pressure drop (1.9 kPa). The emissions of the optimized cyclone according to the present invention are about 75% lower than those of the Cyclop_HE.

6d—HR_MK of 1400 mm

Figure 9:
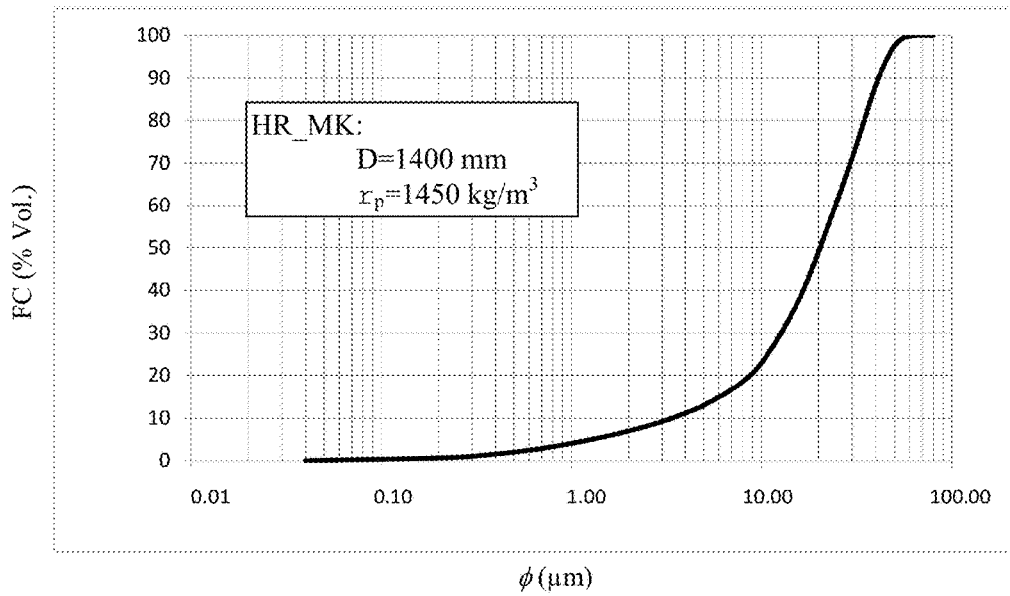
FIG. 9 represents a graph with the particle size distribution used in a cyclone according to the invention (HR_MK) of 1400 mm internal diameter (D) for a large particle density ($\rho_p$) of 1450 kg/m$^3$. The axes are identical to those of FIG. 3.
Figure 10:
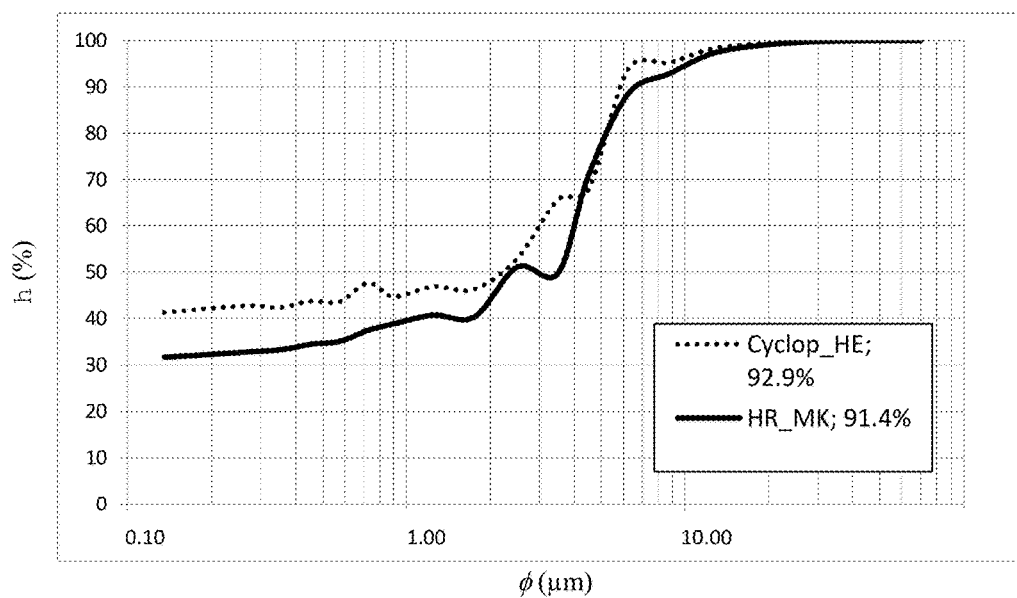
FIG. 10 represents a graph where the grade-efficiencies are compared for the geometry of the invention (HR_MK) and for the geometry Cyclop_HE (for the particles of FIG. 9). The axes are identical to those of FIG. 4.

In this case (FIGS. 9 and 10), the particles used were denser and without an appreciable sub-micrometer fraction, with only 20% below 10 µm, thus with a lower tendency for agglomeration as compared to less dense and finer particles. The geometry according to the present invention (HR_MK) is not superior to the geometry Cyclop_HE, for equivalent pressure drops (1.2 kPa), for particles with density 1450 kg/m$^3$, gas flow-rate of 72000 m$^3$/h@88° C. and an inlet concentration of 460 mg/m$^3$.

7—FINAL COMMENTS

The geometry HR_MK is the one that maximizes efficiency, considering inter-particle agglomeration and minimizing particle re-entrainment. The geometry HR_MK was tested at pilot and industrial-scales, showing significantly higher efficiencies (emissions, on average, 70% lower) than those from a very high efficiency cyclone available in the literature and in the marketplace and patented (EP0972572).

The geometry HR_MK is significantly different from high efficiency geometries available in the marketplace, being the only one, to the knowledge of the inventorsl, which was numerically optimized taking inter-particle agglomeration into account.

Predicted behaviour for industrial-scale situations show that the proposed geometry will have significantly higher efficiencies than those of the most efficient cyclones available in the marketplace, as long as particles to be captured have low densities and with a significant sub-micrometer fraction and also below about 10-20 µm, with expected emission reductions, on average of 70% relative to the Cyclop_HE geometry.

The method and the cyclone according to the invention are particularly preferential for the capture of particles with true densities below 1000 kg/m$^3$, when transported in a gas.

The method and the cyclone according to the invention are particularly preferential for the capture of particles from flue gases where the sub-micrometric fraction ranges from 20% to 30%.

The method and the cyclone according to the invention are particularly preferential for the capture from flue gases where particles below 10-20 µm range from 90% to 100%.

The method and the cyclone according to the invention are even more preferential for the de-dusting of flue gases where particles have any two of the three characteristics given in the three precedent paragraphs, being most preferential for de-dusting of flue gases where the particles combine the three given characteristics.

Considering that the inter-particle agglomeration/clustering promoted by the cyclone according to the invention and respective method is temporary, namely in the cases of the four paragraphs above (specially in the cases of examples 6a to 6c in the preceding section) occurring in the interior of the cyclone and ending when the particles are deposited at its outlet (namely when the particles are collected in any hopper)—being such agglomeration a temporary clustering—it was found that such cyclone and method are particularly indicated for the recovery of powdery material carried in gaseous streams. According to a particular embodiment of the invention, after the method of particle capture according to the invention, thus comprising the agglomerates (clusters) of particles formed inside the cyclone, these, after their removal from the cyclone bottom, are subjected to an additional stage of de-agglomeration (clusters' destruction), that complements the natural separation. According to a particular embodiment, the additional de-agglomeration stage can be done dispersing the clusters in a liquid medium.

The geometry of the cyclones according to the invention is substantially different from those existing in the marketplace, as well as from those referred to in the specialized literature, as it only shares, in the worst case, two of the seven ratios that define the cyclone geometry.

The cross section of the entry is preferably of a square configuration, the dimensions a and b being equal.

Although the entry should be of a tangential type, it may be volute, if the size justifies, without invalidating any of the above considerations.

8—BIBLIOGRAFIA

Clift, R., M. Ghadiri and A. C. Hoffman, "A Critique of Two Models for Cyclone Performance", *AIChE J.*, vol. 37, 285-289, 1991.

Graham, L. J., Taillon, R., Mullin, J. and Wigle, T., "Pharmaceutical process/equipment design methodology case study: Cyclone design to optimize spray-dried-particle collection efficiency", *Computers and Chemical Engineering*, vol. 34, 1041-1048, 2010.

Li, Z., Z. Zisheng and Yu Kuotsung, "Study of structure parameters of cyclones", *Chem. Eng. Res. Des.*, vol. 66, Março, 114-120, 1988.

Licht, W., "Air Pollution Control Engineering-basic calculations for particulate collection", Marcel Dekker, New York and Basel, 1980.

Molerus, O. and Gluckler, M., "Development of a cyclone separator with new design", *Powder Technology*, vol. 86, 37-40, 1996.

Mothes, H. and F. Loffler, "Prediction of particle removal in cyclone separators", *International Chemical Engineering*, vol. 28, 231-240, 1988.

Paiva, J., Salcedo, R. and Araujo, P., "Impact of particle agglomeration in cyclones", *Chem. Eng. J.*, vol. 162, 861-876, 2010.

Ramachandran, G., Leith, D., Dirgo, J and Feldman, H., "Cyclone optimization based on a new empirical model for pressure drop", *Aerosol Sc. and Technology*, vol. 15, 135-148, 1991.

Ravi, G., Gupta, S. K. and Ray, M. B., "Multiobjective optimization of cyclone separators using genetic algorithm", *Ind. Eng. Chem. Res.*, vol. 39, 4272-4286, 2000.

Ray, M. B., Luning, P. E., Hoffmann, A. C., Plomp, A. and Beumer, M. L. L., "Improving the removal efficiency of industrial-scale cyclones for particles smaller than five micrometre", *Int. J. Miner. Process*, vol. 53, 39-47, 1998.

Salcedo, R. and Coelho, M., "Turbulent dispersion coefficients in cyclone flow—an empirical approach", *Can. J. Chem. Eng.*, vol. 77, 609-617, 1999.

Salcedo, R. L. and Pinho, M. J., *Pilot and Industrial-Scale Experimental Investigation of Numerically Optimized Cyclones*, Ind. Eng. Chem. Res., vol. 42, 145-154, 2003.

Salcedo, R. L. and Sousa Mendes, M., "Captura de poeiras finas com ciclones optimizados: estudo de dois casos industriais", *Industria e Ambiente*, n° 30, 2° trimestre, 18-22, 2003.

Salcedo, R. L., "Solving Non-Convex NLP and MINLP Problems with Adaptive Random-Search", *Ind. Eng. Chem. Res.*, vol. 31, no. 1, 262-273, 1992.

Salcedo, R. L. R. and Cândido, M. G., "Global optimization of reverse-flow gas-cyclones: application to small-scale cyclone design", *Separation Sci. and Technology*, vol. 36(12), 2707-2731, 2001.

Salcedo, R. L. R., Chibante, V. G. and Sôra, I., "Laboratory, pilot and industrial-scale validation of numerically optimized reverse-flow gas cyclones", *Trans. of the Filt. Soc.* Vol. 4(3), 220-225, 2004.

Schmidt, P., "Unconventional cyclone separators", *Int. Chem. Eng.*, vol. 33(1), 8-17, 1993.

Sun, G., Chen, J. and Sci, M., "Optimization and applications of reverse-flow cyclones", *China Particuology*, vol. 3, 43-46, 2005.

The invention claimed is:

1. Agglomerating cyclone of the reverse-flow type—comprising a tangential entry of rectangular cross section, of sides a and b, the first parallel to the main cyclone axis; a body of total height H with an upper cylindrical part of internal diameter D and height h and with a bottom inverted conical part whose smaller base has the smaller diameter $D_b$; and one cylindrical vortex tube of height a and diameter $D_e$—presenting a geometry, defined in terms of ratios of the internal dimensions of the referred sides, heights and diameters to the internal diameter D of the cyclone body, according to the following net of intervals of values, relative to the following non-dimensional ratios:

| | |
|---|---|
| a/D | 0.110-0.170; |
| b/D | 0.110-0.170; |
| s/D | 0.500-0.540; |
| $D_e$/D | 0.100-0.170; |
| h/D | 2.200-2.700; |
| H/D | 3.900-4.300; |
| $D_b$/D | 0.140-0.180. |

2. Cyclone according to claim 1, wherein the dimension of the sides a and b are equal, such that the entry section is squared.

3. Cyclone according to claim 1, wherein the entry section is of a volute type.

4. De-dusting method of a gaseous stream, wherein the gaseous stream circulates through a device according to claim 1.

5. De-dusting method according to claim 4, wherein a gaseous stream carrying particles with true density below 1000 kg/m$^3$ circulates through a device according to claim 1.

6. De-dusting method according to claim 4, wherein a gaseous stream carrying particles with a cumulative fraction (mass or volume) below 10-20 μm in the range of 90% to 100% circulates through a device according to claim 1.

7. De-dusting method according to claim 4, wherein a gaseous stream carrying particles with a sub-micrometric cumulative fraction (mass or volume) in the range of 20% to 30% circulates through a device according to claim 1.

8. De-dusting and acid gas dry cleaning method, from a gaseous stream, according to claim 4, wherein, upstream to the cyclone, an appropriate reactant in powder form is injected for acid gas removal.

9. Use wherein the device of claim 1 and corresponding method of claim 8 are employed for de-dusting and cleaning of acid gases.

10. Use according to claim 9, wherein the acid gases are HCl (hydrogen chloride), HF (hydrogen fluoride), $SO_2$ (sulphur dioxide) and/or NOx (nitrogen oxides).

11. Use wherein the device of claim 1 and the corresponding method of claim 4 are employed for de-dusting of flue gases from diesel engines.

* * * * *